(12) United States Patent
Endo et al.

(10) Patent No.: US 6,840,896 B2
(45) Date of Patent: Jan. 11, 2005

(54) ATTACHMENT OF MACHINE TOOL AND MACHINE TOOL

(75) Inventors: Katsuhito Endo, Shizuoka (JP); Takao Date, Shizuoka (JP); Sakashi Adachi, Shizuoka (JP); Yoshiaki Kai, Shizuoka (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/270,307

(22) Filed: Oct. 15, 2002

(65) Prior Publication Data

US 2003/0073553 A1 Apr. 17, 2003

(30) Foreign Application Priority Data

Oct. 16, 2001 (JP) ........................................ 2001-318499

(51) Int. Cl.$^7$ ............................. B23C 7/00; B23Q 3/157
(52) U.S. Cl. ........................ 483/30; 409/230; 409/231; 409/234; 408/137
(58) Field of Search ................................ 483/30, 1, 13; 451/5; 409/131, 132, 230–234, 189, 193, 2.1, 144; 408/124, 237 A, 126, 1 R, 238; 33/561

(56) References Cited

U.S. PATENT DOCUMENTS

| 3,572,595 | A | * | 3/1971 | Lyon ........................ 241/152.2 |
| 4,077,736 | A | * | 3/1978 | Hutchens ...................... 408/16 |
| 4,716,657 | A | * | 1/1988 | Collingwood ............... 408/147 |
| 4,741,650 | A | * | 5/1988 | Nakata ........................ 408/137 |
| 4,805,404 | A | * | 2/1989 | Dupin .......................... 81/470 |
| 5,564,872 | A | * | 10/1996 | Veil et al. .................... 409/234 |
| 5,636,949 | A | * | 6/1997 | Nakamura et al. ........... 409/230 |
| 5,697,739 | A | * | 12/1997 | Lewis et al. ................. 409/230 |
| 6,579,215 | B2 | * | 6/2003 | Katoh et al. .................. 483/30 |
| 2003/0072631 | A1 | * | 4/2003 | Endo et al. .................. 409/231 |

* cited by examiner

Primary Examiner—A. L. Wellington
Assistant Examiner—Dana Ross
(74) Attorney, Agent, or Firm—Pillsbury Winthrop LLP

(57) ABSTRACT

An attachment simplified in structure having resistance to mechanical error, vibration, or heat displacement, provided with a tool mount for rotatably holding a tool, an electric motor for rotating the tool mount, a generator to which rotary force is transmitted from a spindle built in the spindle head for generating electric power to drive the electric motor, and a casing for holding the electric motor and the generator, which is releasably clamped to the spindle head.

5 Claims, 2 Drawing Sheets

ATTACHMENT OF MACHINE TOOL AND MACHINE TOOL

BACKGROUND OF THE INVENTION

1. Field of the Invention

The present invention relates to an attachment for a spindle head of a machine tool.

2. Description of the Related Art

A machining center is a numerical control machine tool capable of so-called combined machining. A machining center may have a variety of attachments attached to its spindle head so as to change the posture and position of a tool and perform the combined machining.

As such an attachment, for example there is known an angle head type which holds a tool at a right angle or a tilt to the spindle and incorporates a transmission mechanism to transmit rotary force of the spindle etc.

However, the above angle head type attachment for a spindle head includes a gear train consisting of a bevel gear etc. and transmits the rotary force of the spindle built into the spindle head to the tool via the gear train, so there is the disadvantage that it is impossible to avoid mechanical error, vibration, heat displacement, etc. Further, there is also the disadvantage that the number of the parts increases and the structure becomes complicated.

SUMMARY OF THE INVENTION

An object of the invention is to provide an attachment for a spindle head of a machine tool having a simplified structure and generating little mechanical error, vibration, heat displacement, etc.

Another object of the invention is to provide a machine tool provided with the above attachment.

According to a first aspect of the present invention, there is provided an attachment for a spindle head of a machine tool having a tool mount for rotatably holding a tool, an electric motor for rotating the tool mount, a generator to which rotary force is transmitted from a spindle built in the spindle head for generating electric power to drive the electric motor, and a casing for holding the electric motor and the generator which is releasably clamped to the spindle head.

Preferably, the generator comprises an alternating current generator for supplying electric power having a frequency corresponding to a rotational speed of the spindle, and the electric motor comprises an induction motor rotating by a rotational speed corresponding to the frequency.

According to a second aspect of the present invention, there is provided a machine tool having a machine tool body comprising a spindle head having built into it a spindle, a drive means for driving the spindle, and at least one control axis for changing a relative position between the spindle head and a workpiece, a control unit for controlling the drive of the drive means and control axis in accordance with a processing program, an attachment attached to the spindle head, and a clamping means for clamping the attachment to the spindle, wherein the attachment comprises a tool mount for holding rotatably a tool, an electric motor for rotating the tool mount, a generator to which rotary force is transmitted from the spindle for generating electric power to drive the electric motor, and a casing for holding the electric motor and the generator, which is releasably clamped to the spindle head.

Preferably, the machine tool according to the present invention further has an automatic attachment changer for automatically changing the attachment of the spindle head.

In the present invention, when the spindle rotates, the generator generates power. The electric power generated by the generator is supplied to the motor. The motor then drives the working tool. The rotational speed of the tool with respect to the rotational speed of the spindle changes in accordance with the properties of the generator and motor.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

A preferred embodiment of the present invention will be described in detail below while referring to the attached figures.

Figure 1:
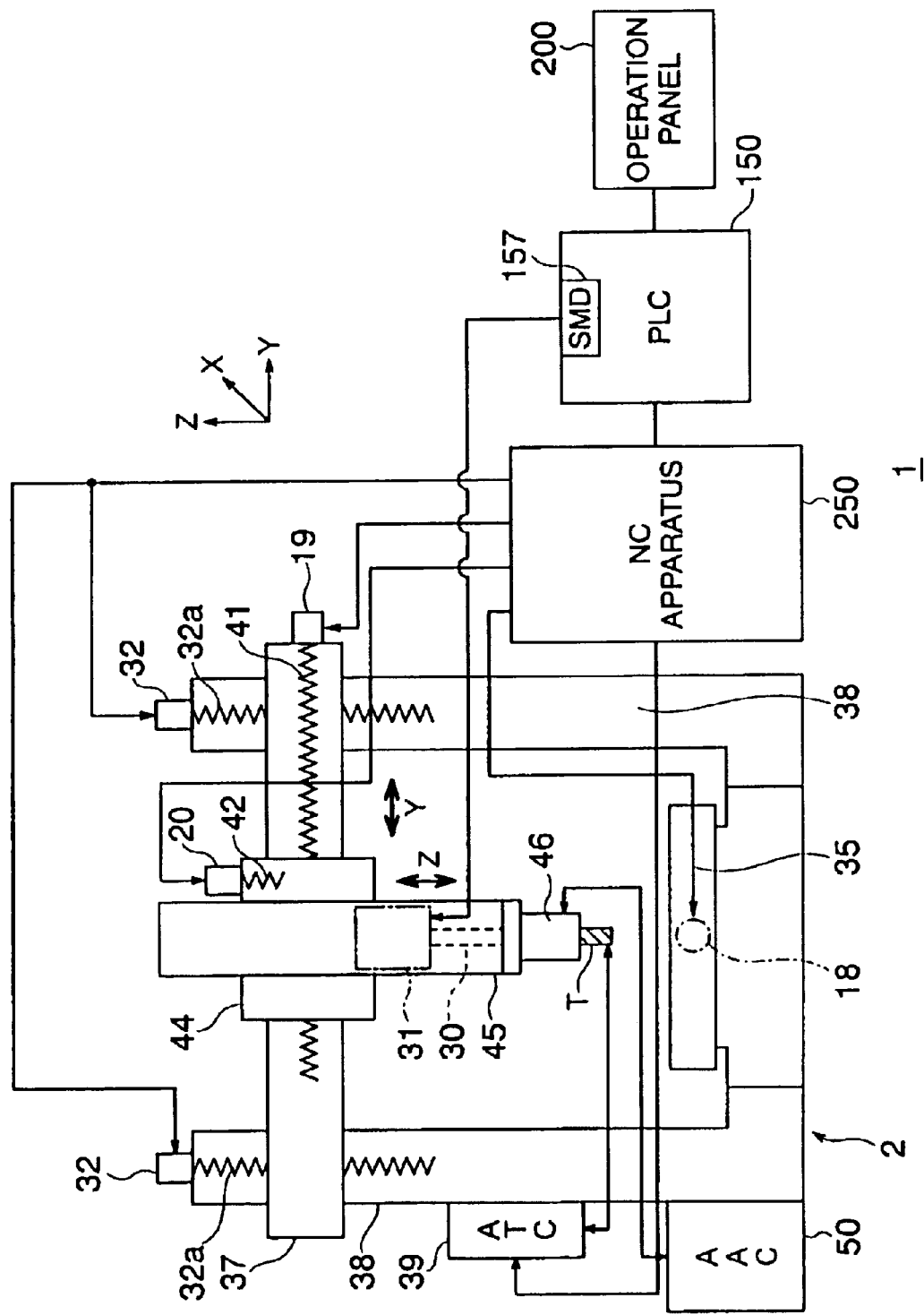
FIG. 1 is a view of the configuration of a machining center as an example of a machine tool to which the present invention is applied.

FIG. 1 is a view of the configuration of a machining center as an example of a machine tool to which the present invention is applied. Note that the machining center is a numerically controlled machining center able to perform multiple machining operations.

The machining center 1 is provided with a machine tool body 2, a numerical control apparatus (NC apparatus) 250, and programmable logic controller (PLC) 150.

In FIG. 1, the machine tool body 2 is provided with a cross rail 37 movably supported at its two ends by shafts of a gantry-type column 38. A ram 45 is provided movably in a vertical direction (Z-axial direction) through a saddle 44 supported movably on the cross rail 37.

The saddle 44 is formed with a not shown thread in the horizontal direction at the inside facing the cross rail 37. This thread is engaged with a feed shaft 41 formed with a thread on its outer periphery.

One end of the feed shaft 41 is connected to a servo motor 19. The feed shaft 41 is driven to rotate by the servo motor 19.

Due to the driven rotation of the feed shaft 41, the saddle 44 can move in the Y-axial direction. Due to this, the ram 45 is moved and positioned in the Y-axial direction. Note that the ram 45 is one embodiment of a spindle head of the present invention.

Further, the saddle 44 is formed with a not shown thread in the vertical direction. The thread of the saddle 44 is engaged with a feed shaft 42 formed with a thread at its periphery. The end of the feed shaft 42 is connected to a servo motor 20.

The feed shaft 42 is driven to rotate by the servo motor 20. Due to rotation of the feed shaft 42, the ram 45 provided movably on the saddle 40 is moved and positioned in the Z-axial direction.

The ram 45 has built into it a spindle motor 31 and holds rotatably a spindle 30. The spindle 30 is connected to the spindle motor 31. This spindle motor 31 rotates the spindle 30.

An attachment 46 is attached to the front end of the ram 45. This attachment 46 holds rotatably a tool T and has built in it a not shown transmission mechanism for transmitting the rotary force of the spindle 30 to this tool T. The tool T is for example an end mill or a drill etc.

Below the ram 45 is provided a table 35 able to move in the X-axial direction. The table 35 is formed with a not shown thread. This is engaged with a not shown feed shaft provided along the X-axial direction. This not shown feed shaft is connected to a servo motor 18.

The table 35 is moved and positioned in the X-axial direction by the rotational drive of the servo motor 18.

The two shafts of the gantry-type column 38 are formed with not shown threads. By driving the rotation of feed shafts 32a engaging with these by cross rail elevating motors 32, the cross rail 37 is elevated or lowered.

An automatic tool changer (ATC) 39 automatically changes various types of tools T at the attachment 46.

This automatic tool changer 39 for example stores various tools T held by tool holders in a not shown magazine. A tool T attached to the attachment 46 is stored in the magazine by a not shown tool changing arm. A required tool T is attached to the attachment 46 by the tool changing arm.

An automatic attachment changer (AAC) 50 automatically changes the attachment 46. There exists a variety of types of attachment 46, for example, a standard snout type, a special long type, 30° head type, a 90° head type, a five-face machining head type, an index head type, etc. The automatic attachment changer 50 is provided with a not shown stocker to accommodate the variety of the attachments 46 and automatically changes the attachments between this stocker and the ram 45.

The numerical control apparatus 250 controls the drive operations of the above servo motors 18, 19, and 20 and the cross rail elevating motors 32.

The numerical control apparatus 250 specifically positions and controls the speed of the tool T and the workpiece by the servo motors 18, 19, 20, and 32 in accordance with a machining routine of the workpiece defined by a machining program in advance. Further, the numerical control apparatus 250 controls the rotational speed of the spindle 30 by for example reading the rotational speed of the spindle 31 defined by an S-code in the machining program.

Further, the numerical control apparatus 250 for example reads the operation for changing the tool T or the attachment 46 defined by an M-code in the machining program and thereby automatically changes a tool T or an attachment 46.

The PLC 150 is connected to the NC apparatus 250 and the operational panel 200. This PLC 150 performs various types of sequence control, for example, starting and stopping the machining center 1 in accordance with a predetermined sequence program, outputting signals to switch on and off the display of the operational panel 200, etc. Further, the PLC 150 is connected to a spindle motor driver 157 to drive and control the spindle motor 31. The PLC 150 outputs control commands to start and stop the spindle motor 31 and control the speed of it to the spindle motor driver 157. Note that PLC 150 performs various types of sequence control for this.

Figure 2:
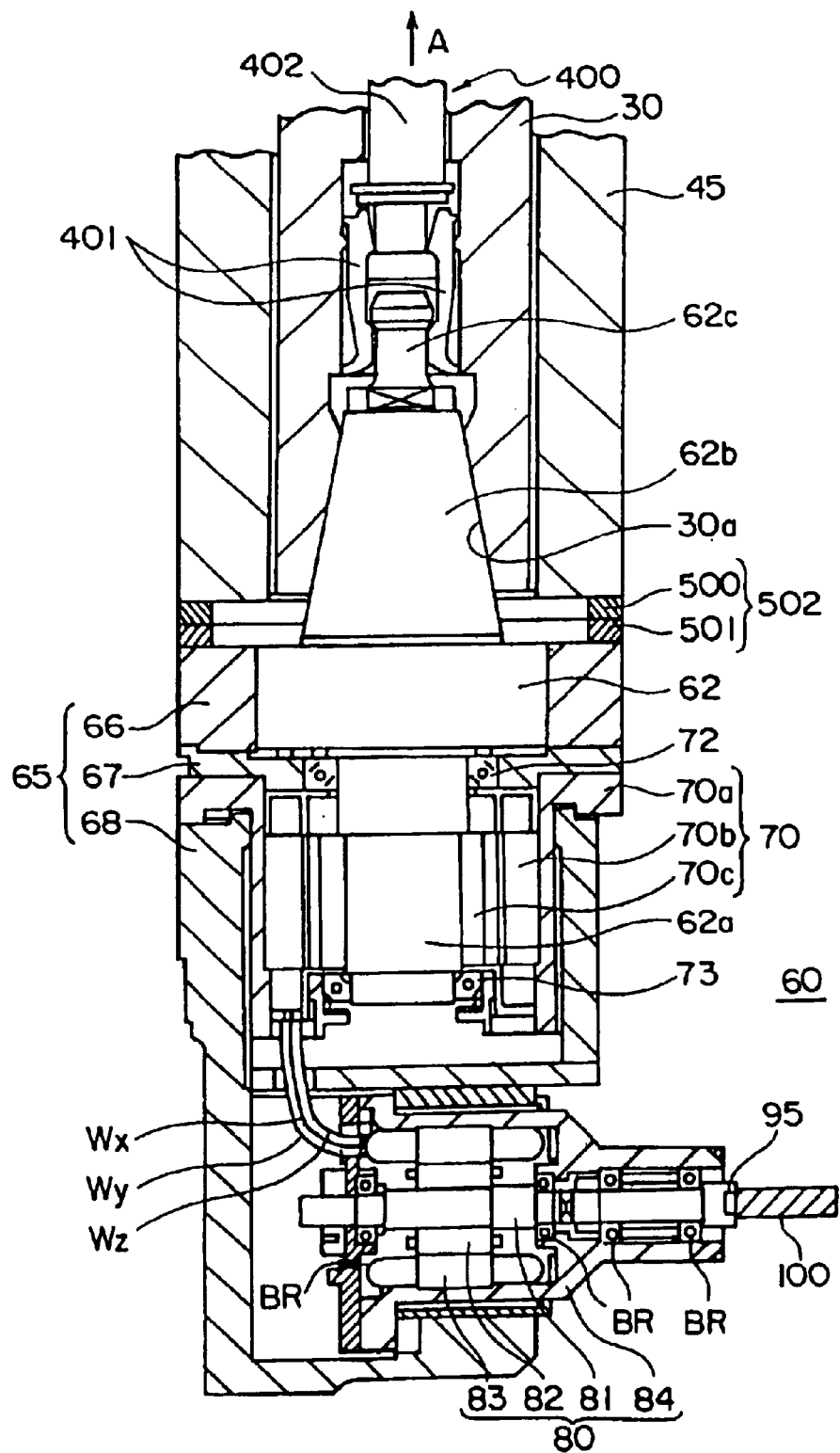
FIG. 2 is a front view of the configuration of an attachment according to an embodiment of the present invention.

FIG. 2 is a sectional view of the configuration of an attachment according to an embodiment of the present invention. The attachment shown in FIG. 2 is a 90° head type attachment. Further, FIG. 2 shows a state of the attachment attached to the front end of the ram 45.

In FIG. 2, the attachment 60 according to the present embodiment has a transmission 62, a generator 70, a casing 65, an electric motor 80, a tool mount 95, and a tool 100. Note that the attachment 60 according to the present embodiment is removably attached to the front end of the ram 45 by the automatic attachment changer 50 in the same way as the above kinds of attachments 46.

The transmission 62 transmits the rotary force of the spindle 30 incorporated in the ram 45 to the generator 70.

The transmission 62 is provided with a taper shank 62b to be attached to a taper sleeve 30a formed at a front end of the spindle 30, a pull stud 62c formed at a front end of the taper shank 62b, and a shaft 62a which is rotatably held by the casing 65 and functions as the input shaft of the generator 70.

The casing 65 is configured with casing parts 66, 67, and 68. These are mutually connected.

The casing part 66 is formed of an annular part. On the top face of the casing part 66, one annular part 500 of a cubic coupling 502 is fixed. The other annular part 501 is fixed at the front end of the ram 45.

The cubic coupling 502 is arranged for coupling the casing 65 with the front end of the ram 45 in a manner enabling the casing 65 to be indexed about the axis of the ram 45. One of the annular parts 500 and 501 is formed with a number of convex teeth in accordance with the minimum index angle of the casing 65. The other of the annular parts 500 and 501 is formed with concave teeth engageable with the convex teeth. For example, when the minimum index angle is one degree, 360 convex teeth and concave teeth are formed.

The casing part 67 is formed of an annular part and holds an angular ball bearing 72 at the inner circumference. The above shaft 62a of the transmission 62 is fit with the angular ball bearing 72. The angular ball bearing 72 rotatably supports the shaft 62a.

The generator 70 has a casing 70a, a stator 70b fixed at the inner circumference of the casing 70a, and a rotor 70c mounted on the shaft 62a of the transmission 62.

The casing 70a is fixed at the inner circumference of the casing part 68.

An angular ball bearing 73 is arranged at the lower side of the inner circumference of the casing 70a. The angular ball bearing 73 rotatably supports the front end of the shaft 62a of the transmission 62.

The generator 70 supplies electric power generated in coils on the side of the stator 70b by the rotation of the shaft 62a to the electric motor 80 via conductive cables Wx, Wy, and Wz. The generator 70 used is for example a three-phase synchronous generator.

The electric motor 80 is fixed at the lower end side of the casing part 68. The electric motor 80 has a casing 84, a rotary shaft 81, a rotor 82 mounted on the rotary shaft 81, and a stator 83 fixed at the inner circumference of the casing 84 and rotates the rotary shaft 81 with the electric power supplied from the generator 70.

The rotary shaft 81 of the electric motor 80 is arranged in a direction at a right angle to the axis of the ram 45.

The rotary shaft 81 is held by a plurality of angular ball bearings BR arranged in the casing 84.

A tool mount 95 for attaching the tool 100 is coupled with the front end of the rotary shaft 81.

The tool 100 is held by the tool mount 95 and machines a workpiece. Specifically, as the tool 100, a cutting tool such as a drill or an end mill may be used.

As the electric motor 80, for example, a three-phase induction motor may be used. The electric motor is connected to the generator 70 by the conductive cables Wx, Wy, and Wz. The electric power generated by the generator 70 is supplied to the electric motor 80 via the conductive cables Wx, Wy, and Wz to be driven.

The above configured attachment 60 is clamped to the front end of the ram 45 by a clamp mechanism 400 incorporated in the side of the ram 45.

The clamp mechanism 400 grips the pull stud 62c of the transmission 62 with a collet 401 arranged at the front end of a rod 402 by pulling strongly the rod 402 inserted into the spindle 30 in the direction of the arrow A shown in FIG. 2. The transmission is strongly pulled in the direction of the arrow A, so the taper shank 62b of the transmission 62 is fit with the taper sleeve 30a so that the center axis of the transmission 62 becomes concentric with the center axis of the spindle 30.

When the transmission is pulled in the direction of the arrow A, the annular parts 500 and 501 of the cubic coupling 502 are engaged and coupled. Then the casing 65 is strongly clamped to the front end of the ram 45.

Next, an example of the operation of the attachment 60 of the above configuration will be explained.

First, the automatic attachment changer 50 attaches the attachment 60 to the front end of the ram 45 of the machine tool body 2.

By attaching the attachment 60 to the front end of the ram 45, the pull stud 62c of the transmission 62 is pulled upward by the collet 401 of the clamp mechanism 400 so that the attachment 600 is strongly fixed on the front end of the ram 45. At this time, the cubic coupling 502 is between the attachment 60 and the ram 45, so the attachment 60 is also strongly fixed about the axis of the ram 45.

By rotating the spindle 30 at the rotational speed of N0 from this state, the transmission 62 of the attachment 60 is rotated, and the rotation of the spindle 30 is transmitted to the generator 70. By this, the generator 70 generates three-phase AC in the case of a three-phase synchronous generator as the generator 70.

The frequency F of the three-phase alternating current generated by the three-phase synchronous generator is expressed by the following formula (1) when the pole number of the generator 70 is p1 and the rotational speed of the spindle 30 is N0 [min−1]:

$$F = p1 * N0/120 \text{ [Hz]} \quad (1)$$

Accordingly, when the spindle 30 is rotated at the rotational speed N0, a three-phase alternating electric power having the frequency F expressed by the above formula (1) is supplied to the electric motor 80.

Here, in case where a three-phase induction motor is used as the electric motor 80, as the pole number of the electric motor 80 is p2, the electric motor 80 is rotated by 2/p2 per cycle of the three-phase alternating current.

Therefore, the synchronous rotational speed of the three-phase induction electric motor when there is no slip is expressed by the following formula (2):

$$N1 = 120 * F/p2 \quad (2)$$

Accordingly, the relationship of the rotational speed N1 of the tool 100 to the rotational speed N0 of the spindle 30 is expressed by the following formula (3):

$$N1 = N0 * p1/p2 \text{ [min}^{-1}\text{]} \quad (3)$$

As understood from formula (3), the rotational speed N0 of the spindle 30 is changed to the rotational speed N1 expressed by the above formula (3).

As expressed by formula (3), it is found that by appropriately setting the ratio between the pole number p1 of the three-phase synchronous generator and the pole number p2 of the three-phase induction electric motor, it is possible to freely set the ratio of the rotational speed of the tool 100 to the rotational speed of the spindle 30.

That is, in the case where it is intended to raise the rotational speed of the cutting tool 100 higher than that of the spindle 30, the ratio of the pole number p1/p2 is set larger than 1. When it is intended to reduce the rotational speed of the cutting tool 100 to lower than that of the spindle 30, the ratio of the pole number p1/p2 is set smaller than 1.

When machining a workpiece comprised of a hard-to-cut material like an aluminum alloy material, sometimes it is desired to increase the rotational speed of the tool 100 over the maximum rotational speed Nmax of the spindle 30.

In such a case, tools having built-in three-phase synchronous generators and three-phase induction motors having pole number ratios $P_1/P_2$ of 10 so that the ratios of speed increase of the tools 60 become for example 10 are stored in advance in the magazine of the automatic attachment changer 50 of the machining center 1.

The attachment 60 is automatically attached to the front end of the ram 45 by the automatic attachment changer 50 in the same way as a normal attachment 46. The spindle 30 is rotated by driving the spindle motor 31. The rotational speed of the tool 100 held by the attachment 60 is controlled by the rotational speed of the spindle 30.

That is, the rotational speed of the tool 100 of the attachment 60 is defined by designating the rotational speed of the spindle 30 by an S-code in advance in the numerical control program downloaded in the NC apparatus 250. The numerical control apparatus 250 controls the rotational speed of the tool 100 of the attachment 60 by controlling the rotational speed of the spindle 30.

For example, when it is desired to rotate the tool 100 of the attachment 60 at the rotational speed of 30,000 min−1, the rotational speed of the spindle 30 is designated as 3000 min−1 by the S-code in the machining program.

When the spindle 30 is rotated at the rotational speed of 3000 min−1, the generator 70 generates a three-phase AC having a frequency in accordance with the rotational speed of the spindle 30 and the pole number of the generator 70 and electric motor 80.

The electric motor 80 is driven by the three-phase alternating current supplied from the generator 70, while the tool 100 of the attachment 60 is rotated at the rotational speed of about 30,000 min−1.

In the above state where the rotational speed of the tool 100 is increased, by moving the workpiece fixed on the table 35 relative to the tool 100 in accordance with the machining program, the workpiece is cut.

By this, it becomes possible to rapidly cut a workpiece while rotating the tool at a rotational speed over the maximum rotational speed of the spindle 30 when using a machining center 1 limited in the maximum rotational speed.

As described above, according to the present embodiment, in the attachment 60 having built in it the generator 70 and the electric motor 80, by driving the electric motor 80 with the electric power generated in the generator 70, the rotational speed of the tool 100 to the spindle 30 is increased. Due to this, the heat is not increased like a gear apparatus even if rotating the spindle 30 at a high speed, so that the heat expansion of the tool 100 is suppressed and the machining accuracy is maintained.

Further, according to the present embodiment, it is not necessary to use a transmission mechanism consisted of a bevel gear etc. to transmit the rotary force from the spindle 30 to the tool 100 in the case that the direction of arrangement between the spindle 30 and the tool 100 is different like the above angle head type attachment. Due to this, mechanical error, heat displacement, vibration, etc. are not easily generated in the attachment 60, so it becomes possible to make the machining accuracy of the workpiece higher.

Further, according to the present embodiment, it is possible to make the inertia of the electric motor 80 smaller than that of the spindle 30, so the response of the tool 100 can be improved compared with directly rotating the spindle 30 at a high speed.

Further, according to the present embodiment, even by rotating the spindle 30 at a high speed, the attachment 60 can be removably attached to the ram 45 (spindle head) and changed by the automatic attachment changer 50 in the same way as an ordinary attachment. Due to this, it is possible to immediately respond to a need for high speed machining while machining within an extent of the ordinary rotational speed.

Further, according to the present embodiment, the tool 100 is driven by the electric power generated by the rotation of the spindle 30. For this reason, it is not necessary to supply electric power from outside of the tool, so a cable for supplying electric power is not necessary between the spindle 30 and the attachment 60.

Note that the present invention is not limited to the above embodiment.

In the above embodiment, the attachment 60 to the ram 45 is clamped by the clamp mechanism 400 built in the ram 45. For example, it is also possible to employ a configuration clamping the casing of the attachment 60 and the ram 45 by using a clamping means such as a bolt. In the case of this configuration, the spindle 30 built in the ram 45 and the transmission 62 of the attachment 60 may be only connected.

While the invention has been described with reference to preferred embodiments chosen for purpose of illustration, it should be apparent that numerous modifications could be made thereto by those skilled in the art without departing from the basic concept and scope of the invention.

What is claimed is:

1. An attachment comprising:
   a rotational power transmission portion to which a rotational power of a main shaft of a machine tool is transmitted;
   an electric generator configured to generate an electric power in response to the rotational power transmitted to the rotational power transmission portion from the main shaft;
   an electric motor which is rotated in response to the electric power generated by the electric generator;
   a tool mounting portion configured to mount a tool which is rotated in response to the rotation of the electric motor;
   a casing including a first, a second and a third casing part, respectively accommodating the transmission portion, the electric generator and the electric motor; and
   a coupling system configured to couple the main shaft and the casing in a manner enabling the casing to be indexed about a rotational axis of the main shaft,
   wherein the transmission portion includes,
      a transmission portion body,
      a taper shank connected to the transmission portion body, passed through the coupling system, and projected therefrom, and having a taper configured to fit a taper sleeve of the main shaft, and
      a pull stud connected to the taper shank, and engaging with a collet provided inside of the main shaft,
   wherein the coupling system includes, a first annular coupling member having a plurality of teeth defined by the minimum index angle of the casing and fixed to a front end of the main shaft, and a second annular coupling member having a plurality of concave teeth engageable with the convex teeth and connected to the first casing part,
   wherein the convex teeth of the first annular coupling member and the concave teeth of the second annular coupling member are engaged when the pull stud of the transmission portion is pulled by the collet and the taper shank is fitted into the taper sleeve,
   wherein the first casing part is connected to the second annular coupling member at one end of the first casing part and to the second casing part at another end of the first casing part, the first casing part accommodating the transmission portion body inside thereof,
   wherein the second casing part is connected to the first casing part at one end thereof and to the third casing part at another end thereof, the second casing part being formed as an annular casing member configured to accommodate the electric generator, a rotor thereof being coupled to the transmission portion body by an angular ball bearing, permitting free rotation, and a stator thereof being fixed to an inner wall of the second casing member, and
   wherein the third casing part is connected to the second casing part at one end thereof and to the tool mounting portion at another end thereof, the third casing part being formed as an annular casing part configured to accommodate the electric motor.

2. An attachment as set forth in claim 1, wherein
   the electric generator comprises a three phase synchronous type generator,
   the electric motor comprises a three phase induction type motor, and
   a rotational speed change ratio for defining the rotational speed of the tool is determined by changing the number of poles of the electric generator and the electric motor.

3. A machine tool comprising:
   a main shaft;
   a rotation driving system configured to rotate the main shaft;
   a moving system configured to move a position of the main shaft;
   an attachment configured to attachably and detachably hold a tool, and to rotate the tool at a rotational force in response to the rotation of the main shaft, and
   a control system configured to drive the rotation driving system in response to a machining condition of a work to be machined by the tool and to control a relative position between the moving system and the work,
   wherein the attachment comprises
   a rotational power transmission portion to which a rotational power of a main shaft of a machine tool is transmitted;
   an electric generator configured to generate an electric power in response to the rotational power transmitted to the rotational power transmission portion from the main shaft;
   an electric motor which is rotated in response to the electric power generated by the electric generator;

a tool mounting portion configured to mount a tool which is rotated in response to the rotation of the electric motor, a casing including a first, a second and a third casing part, respectively accommodating the transmission portion, the electric generator and the electric motor; and a coupling system configured to couple the main shaft and the casing in a manner enabling the casing to be indexed about a rotational axis of the main shaft, wherein the transmission portion includes, a transmission portion body, a taper shank connected to the transmission portion body, passed through the coupling means and projected therefrom, and having a taper configured to fit a taper sleeve of the main shaft, and a pull stud connected to the taper shank, and engaging with a collet provided inside of the main shaft, wherein the coupling system includes, a first annular coupling member having a plurality of teeth defined by the minimum index angle of the casing and fixed to a front end of the main shaft, and a second annular coupling member having a plurality of concave teeth engageable with the convex teeth and connected to the first casing part, wherein the convex teeth of the first annular coupling member and the concave teeth of the second annular coupling member are engaged when the pull stud of the transmission portion is pulled by the collet and the taper shank is fitted into the taper sleeve, wherein the first casing part is connected to the second annular coupling member at one end of the first casing member and to the second casing part at another end of the first casing part, the first casing part accommodating the transmission portion body inside thereof, wherein the second casing member is connected to the first casing part at one end thereof and to the third casing part at another end thereof, the second casing member being formed as an annular casing member configured to accommodate the electric generator, a rotor thereof being coupled to the transmission portion body by an angular ball bearing, permitting free rotation, and a stator thereof being fixed to an inner wall of the second casing part, and wherein the third casing part is connected to the second casing part at one end thereof and to the tool mounting portion at another end thereof, the third casing part being formed as an annular casing member configured to accommodate the electric motor.

4. A machine tool as set forth in claim 3, wherein the electric generator comprises a three phase synchronous type generator, the electric motor comprises a three phase induction type motor, and a rotational speed change ratio for defining the rotational speed of the tool is determined by changing the number of poles of the electric generator and the electric motor.

5. A machine tool as set forth in claim 3, further comprising an automatic attachment exchange apparatus configured to automatically exchange the attachment to the main shaft.

* * * * *